US00RE37468B1

(19) United States
(12) Reissued Patent
Kennedy et al.

(10) Patent Number: US RE37,468 E
(45) Date of Reissued Patent: Dec. 11, 2001

(54) GAME BALL WITH SYNTHETIC LEATHER COVER

(75) Inventors: Thomas Kennedy, Wilbraham, MA (US); Derrick K. Brantley, West Chester, PA (US)

(73) Assignee: Spalding Sports Worldwide, Inc., Chicopee, MA (US)

(21) Appl. No.: 09/304,460

(22) Filed: May 3, 1999

Related U.S. Patent Documents

Reissue of:
(64) Patent No.: 5,669,838
Issued: Sep. 23, 1997
Appl. No.: 08/568,655
Filed: Dec. 7, 1995

U.S. Applications:

(63) Continuation-in-part of application No. 08/322,775, filed on Oct. 13, 1994, now abandoned.

(51) Int. Cl.[7] ..... A63B 41/08
(52) U.S. Cl. ..... 473/599; 473/596; 473/604
(58) Field of Search ..... 473/596, 599, 473/604; 273/DIG. 8

(56) References Cited

U.S. PATENT DOCUMENTS 4,093,219 * 6/1978 Piraud .
4,149,720 * 4/1979 Heald, Jr. ..... 273/60 R
4,256,304 * 3/1981 Smith et al. ..... 273/60 B
4,333,648 * 6/1982 Aoyama ..... 273/65 EB
4,462,590 * 7/1984 Mitchell ..... 273/65 E
4,515,852 * 5/1985 Katabe et al. .
4,653,752 * 3/1987 Miller ..... 273/60 B
4,725,058 * 2/1988 Molitor ..... 273/60 B
4,840,378 * 6/1989 Molitor ..... 273/60 B
4,880,233 * 11/1989 Song ..... 273/60 R
5,069,935 * 12/1991 Walters ..... 273/65 E X
5,091,265 * 2/1992 Kennedy et al. ..... 273/58 A X
5,098,097 * 3/1992 Kennedy et al. ..... 273/65 EC
5,310,178 * 5/1994 Walker .
5,669,838 * 9/1997 Kennedy et al. ..... 473/596

* cited by examiner

*Primary Examiner*—Jeanette Chapman
*Assistant Examiner*—Vishu Mendiratta

(57) ABSTRACT

A game ball having a high end synthetic leather cover formed from a non-woven fiber mat impregnated with polyurethane. In one embodiment, the game ball is a football and the fibers in the backing of the cover material have a denier of about 0.1 or less. In another embodiment, the game ball cover has a dual layer coating to impart to the cover good pebble retention. The first layer has a Shore A hardness of at least about 65, and the second layer surrounding the first layer has a Shore A hardness lower than the hardness of the first layer. The game ball, which can be formed to meet association specifications, has properties of softness and durability comparable to those of a genuine full grain leather game ball.

25 Claims, 2 Drawing Sheets

GAME BALL WITH SYNTHETIC LEATHER COVER

Matter enclosed in heavy brackets [ ] appears in the original patent but forms no part of this reissue specification; matter printed in italics indicates the additions made by reissue.

This application is a continuation in part of application Ser. No. 08/322,775, filed Oct. 13, 1994, and entitled "Football with Polyurethane Cover", now abandoned.

BACKGROUND OF THE INVENTION

This invention generally relates to game balls, and more particularly to an improved game ball having an interior inflatable bladder or a central core, and a cover made of a synthetic leather material.

Current American footballs are constructed with an inflatable, generally elliptically-shaped bladder which is covered by four generally ovally-shaped panels of pebbled cover material seamed together along their edges. One of the seams is not stitched along a central extent thereby forming an opening to allow the bladder to be inserted within the panels during fabrication. After insertion, the opening is closed through lacing and associated components. The lining panels are stitched to each other and to associated panels.

Genuine full grain leather traditionally has been deemed to be the best cover material for footballs due to its softness and durability. Such material provides a firm but relatively soft cover that advantageously provides for good gripability and spin. Furthermore, full grain leather has a tendency to absorb water and therefore covers made of leather do not become slippery in rainy weather. Leather footballs are used by the National Football League, and other professional leagues, as well as the NCAA, high schools, etc. Inferior play traditionally has resulted when the football covers were fabricated of synthetic materials or split grain leather.

Synthetic football covers frequently are made of polyvinylchloride (PVC) or other polyurethane based materials. The backing of these materials traditionally has been either a woven fabric or an impregnated non-woven fabric with a fiber size of at least 1 denier (50 milligrams per 450 meters of fiber length). Synthetic cover materials of this type are durable but lack the softness of genuine leather. Furthermore, they become slippery in wet weather, as water tends to adhere to the surface of such cover materials.

SUMMARY OF THE INVENTION

An object of the invention is to provide a new and improved game ball having a high performance, synthetic leather stitched cover which exhibits softness and durability comparable to covers made of full grain or coated split leather.

Another object of the invention is to provide a game ball of the type described below having a synthetic leather cover wherein the ball has properties such as tackiness and softness which replicate, or are superior to, the properties of a game ball having a full grain leather cover.

A further object of the invention is to provide a synthetic covered game ball for use in competitive play which has improved wear, feel and handing characteristics, as well as good durability.

A still further object of the invention is to provide a game ball having a cover of durable, fiber reinforced polyurethane in place of the finer grades of leather.

Other objects of the invention will be in part obvious and in part pointed out more in detail hereinafter.

The invention in a preferred form is a football having an interior inflatable bladder formed in a generally elliptical shape, and a cover secured over the bladder which is formed from a plurality of panels, each of which includes a backing and an outer coating formed thereon. The backing includes a fiber reinforced polyurethane material with the fibers having an average denier of 0.1 or less (about 3.3 microns). The football also has a liner positioned between the bladder and the cover, and lacing joining adjacent panels of the cover. The football has the same or better softness and durability than a full grain leather football.

In a particularly preferred form of the invention, the fibers in the backing have an average denier of 0.02 or less (about 0.66 microns), and most preferably 0.01 or less. The fibers in the backing preferably are formed from a polyamide and/or a polyester.

The outer coating of the football cover preferably comprises a polyurethane. This coating can be made of a fiber-reinforced polyurethane or a non-fiber-reinforced polyurethane.

Another preferred form of the invention is a game ball having a center and a cover surrounding the center. The cover includes a backing layer formed from a fiber reinforced polyurethane material. A multi layer coating is formed over the backing and includes a first coating layer having a Shore A hardness of at least about 65 and a second coating layer with a Shore A hardness which is lower than the Shore A hardness of the first coating layer.

The first coating layer preferably has a thickness of about 1–15 mils. The second coating layer preferably has a thickness of 0.1–10 mils. The combined thicknesses of the first and second coating layers preferably is in the range of 1–25 mils. The first coating layer preferably has a Shore hardness of 65A-60D (ASTM D2240) and a Sward rocker hardness of 25–60 (ASTM D2134). The second coating layer preferably has a Shore A hardness of 30–65 (ASTM D2240) and a Sward rocker hardness of 10–30 (ASTM D2134).

The fiber reinforced polyurethane material preferably is formed from fibers having an average denier of 0.1 or less.

The game ball of the invention preferably has a cover with embossed pebbles. The first coating layer has properties of hardness and thickness sufficient to provide the pebbles with a retention level of at least 80% of their molded set. When the game ball has an embossed texture, it preferably has a coefficient of friction which is higher than the coefficient of friction of a conventional leather covered game ball designed for the same sport.

The invention also is directed to a method of making a game ball of the type described above.

A better understanding of objects, advantages, features, properties and relationships of the invention will be obtained from the following detailed description wherein the features of construction, combination of elements and arrangement of parts and/or process steps will be exemplified and are indicative of the way in which the principles of the invention are employed.

DETAILED DESCRIPTION OF THE INVENTION

Figure 1:
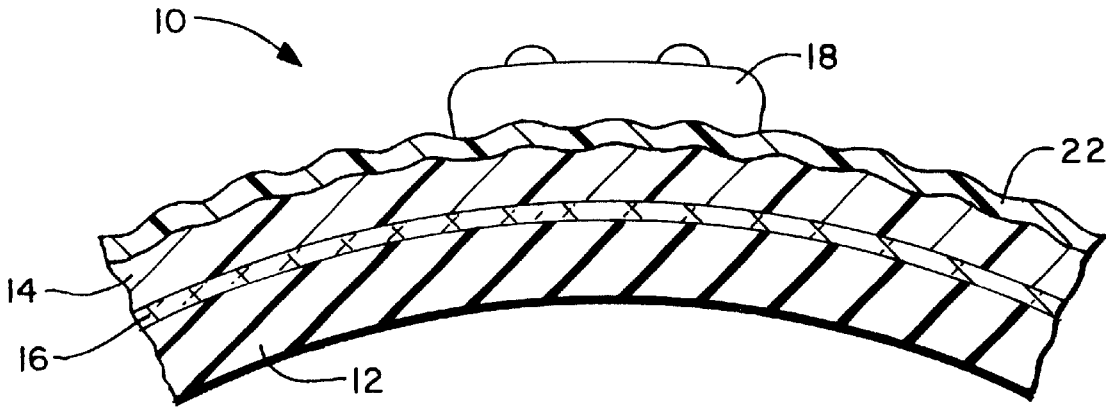
FIG. 1 schematically shows a fragmentary cross sectional view of a first embodiment of a game ball according to the invention.

Referring now to FIG. 1, a cross-section of a portion of a football according to the invention is shown and is designated as 10. The football includes five major components, namely (1) an interior balloon or bladder 12, (2) a cover 14 made of panels, (3) a liner 16 positioned between the bladder and the cover, (4) a top coat 22 formed over the cover 14 and (5) lacing 18 to connect portions of two adjacent cover panels and to provide for gripability when the football is thrown. A regulation NCAA football has a weight of 396.2–425.25 grams and must meet specific size requirements defined in terms of length, girth, long circumference over laces, and long circumference not over laces.

More specifically, the bladder 12 has an elliptical shape and is adapted to be filled with air. The preferred material for the bladder 12 is butyl rubber. Other suitable materials include, but are not limited to, natural rubber, mixes of butyl rubber and natural rubber, polyurethane and latex. The bladder 12 typically is molded as a one-piece component and is of a size suitable to result in a football having a length of 10.875–11.4375 inches, a girth of 20.75–21.25 inches, a long circumference over the laces of 27.75–28.125 inches, and a long circumference not over the laces of 27.375–27.625 inches.

The liner 16, which surrounds the bladder 12, preferably is formed of a relatively non-elastic material such as a woven fabric or a woven fabric embedded with a PVC for further stability. The liner 16 typically consists of four panels, each of which is stitched to an associated cover panel.

The cover 14 of the football is formed from a plurality of panels, which are cut to an appropriate size and then stitched together.

Figure 2:
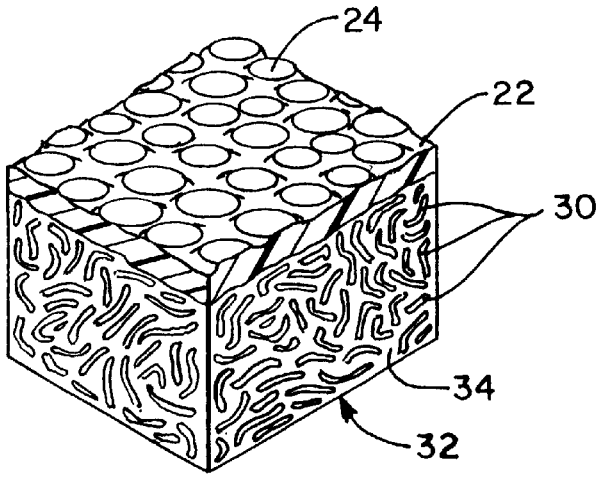
FIG. 2 schematically shows an enlarged and exaggerated view of a piece of the coated cover material for the game ball of FIG. 1.

As shown in FIG. 2 the coated cover material which is used in the first embodiment of the football of the invention is formed from a plurality of monofilament polymeric fibers 30 of a polyamide, such as Nylon, or a polyester compressed together in an array to form a mat 32 with polyurethane material 34 located above, below, and throughout the spaces between the non-woven fibers. On average, the fibers preferably have a denier of about 0.001–0.1, preferably 0.001–0.05, and most preferably 0.005–0.02. It is also preferable that the maximum fiber size does not exceed a denier of 0.1 (about 3.3 microns), more preferably 0.05 and most preferably 0.02. This is a size significantly smaller than the fibers traditionally used to form synthetic football cover panels. It has been found that this smaller size results in a synthetic leather football cover which is softer than other synthetic leather football covers and has sufficient durability, i.e., shape-retaining characteristics. On the exterior surface of the panels, a grain-like pattern of raised portions in an irregular pattern, is formed to simulate leather. The exterior surface is also then preferably painted to simulate grain leather. The cover material preferably has a basis weight of 600–1400 g/m$^2$, more preferably 800–1100 g/m$^2$, and most preferably about 850–900 g/m$^2$.

It is noted that the synthetic leather which is used for the football of the invention can be superior to a genuine leather football in consistency. While a sheet of genuine leather may have different strengths on different parts of the sheet, the synthetic leather of the invention can be manufactured such that it has a uniform strength. Furthermore, the synthetic leather of the invention is less likely than genuine leather to be subject to variations in available supply.

A preferred technique for fabrication of the cover material which is used in one embodiment of the football is to form an impregnation of fibers with polyurethane. The material subsequently undergoes an extraction process to give the material a soft feel. The top coat on the material also can be polyurethane, and can be, but need not necessarily be, the same material that is used to impregnate the fibers. A polyester-based polyurethane is useful. Other coating resins which adhere to the fiber reinforced polyurethane and which impart a leather-like feel to the cover material also can be used as the top coat, including but not limited to thermoplastic rubbers, natural rubber, polyether urethanes, metallocene polyethylenes, polyureas, PVC plastisols, EPDM rubber, and the like.

One preferred process for preparing the football cover material includes the formation of a substrate which is prepared by providing a nonwoven mat of fibers of nylon or polyester (preferably nylon), with a fiber denier of 0.01 in a thickness appropriate to result in a final cover material thickness of about 0.5–3 mm, more preferably 1.5–2.5 mm, and most preferably about 2.2 mm. Optionally, each fiber is coated with a starch.

The nonwoven mat is dipped in hot toluene for a period of time sufficient to dissolve off the LDPE outer shell of the fiber, thereby exfoliating the central nylon or polyester fibers. At the same time, the special additives, if used, are extracted or removed out of the sheet material for softening of the material. Next, the mat of extracted fibers is coated with polyurethane in a DMF solution.

More specifically, a solution of polyurethane elastomer, with sorbitan monostearate and stearyl alcohol as optional additives in an amount of a few percent by weight, is forced into the non-woven fabric of mat fibers, and the solution impregnates the non-woven fabric. Then, the base material with the polyurethane coating layer is put into an aqueous solution. This coagulates the solution of polyurethane elastomer and, during this wet coagulation process, the polyurethane elastomer changes the fibers into a microporous structure to form a cellular plastic. In this coagulation process, the additives work as an accelerator to get more micropores and/or as a controller of the size of the pores. The coagulation process provides for the soft feel of the cover material.

The impregnated sheet material is dried. Subsequently, a top coat 22 of polyurethane or another suitable top coat material is applied to the sheet material by, e.g., lamination or a gravure or knife coating process.

Figure 3:
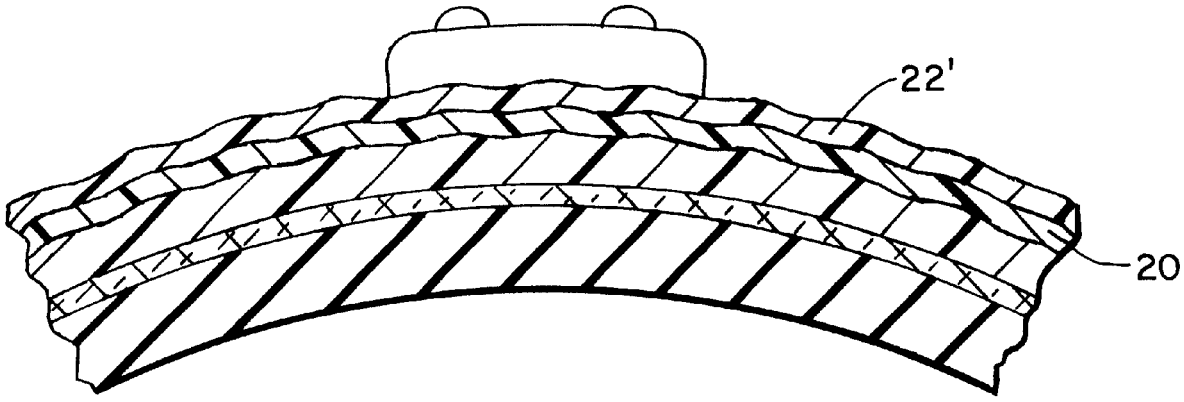
FIG. 3 schematically shows a fragmentary cross sectional view of a second embodiment of a game ball according to the invention.

The football of FIG. 3 differs from the embodiment of FIG. 1 in that a multi-layer top coat of polyurethane or another suitable top coat material is applied to the backing or sheet material. More specifically, after drying of the extracted sheet material a hard, first coating 20 of a polyurethane or another suitable top coat material which preferably has a Shore A hardness of about 65 or more and more preferably a Shore hardness of 65A-60D is applied to one side of the sheet material by, e.g., a gravure coating or knife coating process. Suitable materials for the first coating 20 include but are not limited to polyurethane, thermoplastic rubber, PVC plastisol, polyurea or the like. The first coating 20 has a post-curing thickness and a hardness sufficient to provide for good pebble retention of the final ball as a result of embossing. More particularly, the first coating has a thickness and hardness appropriate to give the pebbles or another embossed pattern such as dimples, or the like, a depth retention of 80% based upon their molded set, i.e. the original mold depth, and preferably a depth retention of at least 95%. In a preferred form of the second embodiment of the invention, the first coating has a thickness of 1–15 mils. It has been found that excellent pebble retention is achieved when the first coating has a combination of a thickness of 2–10 mils and a Shore hardness of 90A-50D. The first coating 20 is cured using heat or any other suitable curing technique. It is noted that in an alternative and less preferred method, the first coating 20 can be laminated onto the sheet material.

Figure 4:
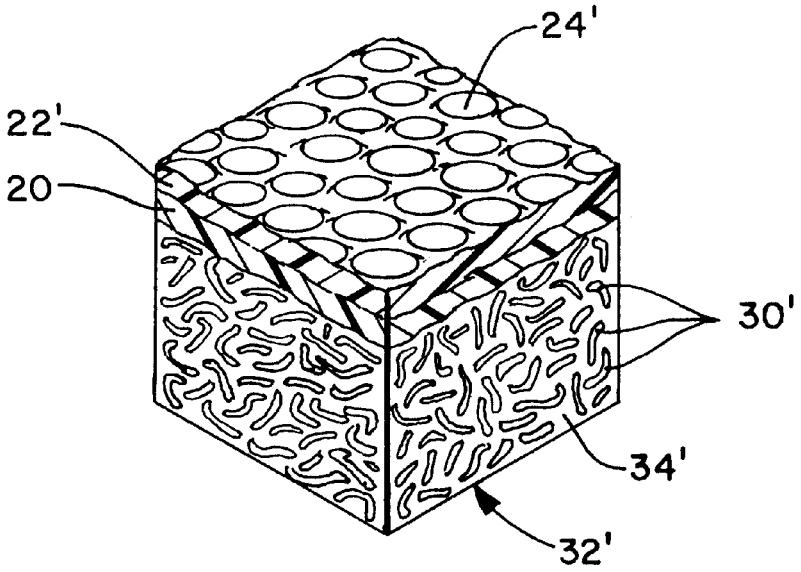
FIG. 4 schematically shows an enlarged and exaggerated view of a piece of the coated cover material for the game ball of FIG. 3.

After the first coating 20 has cured or dried so as to be machine-workable, a second coating 22' of a polyurethane or another suitable material which has a lower Shore A hardness than the first coating 20, and preferably has a Shore hardness of 30A-65A and a Sward rocker hardness of 10–30, and more preferably a Shore hardness of 30A-50A and a Sward hardness of 10–20 is applied over the first coating 20. Suitable materials for the second coating include, but are not limited to, polyurethane, polyurea, PVC plastisol, thermoplastic rubber, EPDM rubber, and the like. The second coating 22' has a thickness of 0.1–10 mils. It has been found that excellent pebble retention is achieved when the when the second coating has a thickness of 0.5–50 mils and a Shore hardness of 30A-65A. The second coating 22' is cured using heat or another suitable coating technique. In an alternative and less preferred method, the second coating 22' can be laminated either separately or together with the first coating 20. An enlarged view of the cover material of the embodiment of FIG. 3 is shown in FIG. 4.

After both the first and second coatings 20, 22' have been formed on the game ball, the ball is heated and embossed in a conventional manner to form a plurality of pebbles 24'. Optionally, the outer tips of the pebbles are colored with a dark coloring agent for aesthetic reasons using a tip coat solution in a manner which is known to one having ordinary skill in the art. The embossed cover preferably has a higher coefficient of friction than conventional leather-covered game balls designed for the same sport.

It is noted that additional coatings can be added on either side of the first coating 20 in order to impart other desired characteristics, e.g., abrasion resistance, to the game ball.

The two-part coating of the invention can be used to make game balls, such as footballs, with a pebble depth of e.g. 0.5–1.0 mm. In contrast, the football which is described above and which has a single top coat typically had a pebble depth of 0.25–0.5 mm.

Referring to FIG. 4, the cover material of the second embodiment of the invention has a mat of polymeric fibers 30' of a polyamide or a polyester compressed together to form a mat 32' with polyurethane material 34' located above, below and throughout the spaces between the non-woven fibers. The first coating 20 is sandwiched between the mat 32' and the pebbled second coating 22'. The first coating is not smooth, but instead has a contoured shape as a result of embossing. Furthermore, the outer portion of the mat has a slightly contoured surface as a result of embossing.

Typically, for a football with a cover material having a non-fiber-reinforced coating and an overall thickness in the range of 0.5–3 mm, the backing comprises about 85–98% of the overall cover thickness, with the coating forming the remainder of the thickness. More preferably, the backing forms 90–98% of the overall cover thickness, and most preferably about 95%.

When the football cover material has an outer coating which is formed from a fiber reinforced material, the backing preferably constitutes about 70–90% of the overall cover thickness, more preferably 80–88%, and most preferably about 85%. The selection of a particular polyurethane or other coating into which the fibers are incorporated will depend in part upon the type and size of fibers which are used. If fibers with a very small denier are used, a hard polyurethane generally will be required to achieve a leather-like texture. If fibers with a larger denier are used, a softer polyurethane probably will be needed to achieve a leather-like texture. Typically, the fibers in the outer coating layer have a denier of 0.001–0.1, more preferably 0.001–0.05, and most preferably 0.005–0.02.

The use of the inventive polyurethane cover material has been found to provide characteristics to the game balls which are superior to the characteristics of many known game balls which are not made of high grade synthetic leather. Its characteristics are essentially the same as that of high grade leather for wear characteristics as well as feel or handling properties.

The cover material alone, when tested for physical properties and compared to current raw material specifications for both leather and PVC, meets or exceeds all requirements for football covers. Accordingly, the cover material can be appropriately stitched to meet not only manufacturing requirements for the balls, but also the standard field play requirements for durability.

From a subjective standpoint, the difference between the game balls of the invention and game balls covered with other synthetics is obvious to the touch. The ball which is produced with the above-described polyurethane has a distinctly softer feel which results in improved ball control. The material described above differs from other known synthetic football covers in that other known synthetics have a harder, more plastic-like feel. After normal wear, the covered ball of the present invention retains its soft feel and develops increased tackiness as a result of the backing of the fibers becoming exposed as more fully disclosed in U.S. Pat. No. 5,310,178, the contents of which are incorporated herein by reference. This quality is similar to the wear characteristics of leather. On the other hand, conventional synthetics tend to acquire a rubber-like feel after extended use.

A football of the invention is assembled in the following manner. The football cover panels are cut in a generally oval shape and are coupled together at their edges by stitches and positioned over the bladder. Four essentially similarly shaped, generally oval shaped panels are normally utilized with the panels in abutment along their edges. Their edges are in-turned and stitched. The liner is formed from a plurality of components having the same shape and size as the cover panels. The liner components are stitched to the cover panels along their peripheries. The edges of the panels and liner components are then stitched together along their edges forming seams and creating a football-shaped shell for receiving a pre-molded bladder. The stitching is made while the panels and liner are inside out. A central extent along one seam is not stitched to thereby form an opening through which the bladder may be inserted during fabrication. A tongue and two patches are then sewn to the panels and liner in a conventional manner, with the patches spanning the unstitched opening. The tongue is sewn to a cover panel and liner along a short extent offset slightly from the patches. The panels and liner components are then turned inside out and the bladder is inserted. The opening is then closed by lacing with the tongue having an enlarged portion located between the bladder and the patches. The structure of the lacing and closure are further described in U.S. Pat. No. 5,098,097, the contents of which are incorporated herein by reference.

Optionally, the football of the present invention includes a weighting system to provide a truer spiral when the football is thrown, which also is described in U.S. Pat. No. 5,098,097.

A basketball, volleyball, softball, or other game ball of the invention can be assembled in a conventional manner.

As will be apparent to persons skilled in the art, various modifications and adaptations of the structure above described will become readily apparent without departure from the spirit and scope of the invention.

What is claimed is:

1. A game ball, comprising:

a center, a cover secured over the center, the cover including a backing comprising a fiber reinforced polyurethane material, a first coating layer formed over the backing having a Shore A hardness of at least about 65, and a second coating layer surrounding the first coating layer, the second coating layer having a Shore A hardness which is lower than the Shore A hardness of the first coating layer.

2. A game ball according to claim 1, wherein the first coating layer has a thickness of about 1–15 mils.

3. A game ball according to claim 1, wherein the second coating layer has a thickness of about 0.1–10 mils.

4. A game ball according to claim 1, wherein the sum of the thicknesses of the first and second coating layers is about 1–25 mils.

5. A game ball according to claim 1, wherein the first coating layer has a Shore hardness of about 65A-60D.

6. A game ball according to claim 1, wherein the second coating layer has a Shore A hardness of about 30–65.

7. A game ball according to claim 1, wherein the fiber reinforced polyurethane material comprises fibers having an average denier of 0.1 or less.

8. A game ball according to claim 1, wherein the fiber reinforced polyurethane material comprises fibers having an average denier of 0.02 or less.

9. A game ball according to claim 1, wherein the fiber reinforced polyurethane material comprises fibers having an average denier of 0.01 or less.

10. A game ball according to claim 1, wherein the backing fibers contain at least one material selected from the group consisting of a polyamide and a polyester.

11. A game ball according to claim 1, wherein the game ball cover has embossed pebbles and the first coating layer has properties of hardness and thickness sufficient to provide the pebbles with a retention level of at least 80% of their molded set.

12. A game ball according to claim 1, wherein the cover has an embossed texture.

13. A game ball according to claim 1, wherein the first coating layer has a Sward rocker hardness (ASTM-D2134) of 25–60.

14. A game ball according to claim 1, wherein the second coating layer has a Sward rocker hardness (ASTM-D2134) of 10–30.

15. A method of making a game ball, comprising:

obtaining a game ball center, securing a cover over the center, the cover including a backing comprising a fiber reinforced polyurethane material, a first coating layer formed over the backing having a Shore A hardness of about 65, and a second coating layer surrounding the first coating layer, the second coating layer having a Shore A hardness which is lower than the Shore A hardness of the first coating layer.

*16. A game ball, comprising:*

*a center,*

*a cover secured over the center, the cover including a backing comprising a fiber reinforced polyurethane material, a first coating layer having a Shore A hardness formed over the backing and a second coating layer surrounding the first coating layer, the second coating layer having a Shore A hardness which is lower than the Shore A hardness of the first coating layer.*

*17. A game ball according to claim 16, wherein the first coating layer has a thickness of about 1–15 mils.*

*18. A game ball according to claim 16, wherein the second coating layer has a thickness of about 0.1–10 mils.*

*19. A game ball according to claim 16, wherein the sum of the thicknesses of the first and second coating layers is about 1–25 mils.*

*20. A game ball according to claim 16, wherein the fiber reinforced polyurethane material comprises fibers having an average denier of 0.1 or less.*

*21. A game ball according to claim 16, wherein the fiber reinforced polyurethane material comprises fibers having an average denier of 0.02 or less.*

*22. A game ball according to claim 16, wherein the fiber reinforced polyurethane material comprises fibers having an average denier of 0.01 or less.*

*23. A game ball according to claim 16, wherein the backing fibers contain at least one material selected from the group consisting of a polyamide and a polyester.*

*24. A game ball according to claim 16, wherein the game ball cover has embossed pebbles and the first coating layer has properties of hardness and thickness sufficient to provide the pebbles with a retention level of at least 80% of their molded set.*

*25. A game ball according to claim 16, wherein the cover has an embossed texture.*

* * * * *